United States Patent Office 3,591,608
Patented July 6, 1971

3,591,608
MACROCYCLIC KETOLACTONES
Hans U. Immer, Cote St. Luc, Montreal, Quebec, and Jehan F. Bagli, Valois Gardens, Quebec, Canada, assignors to Ayerst, McKenna & Harrison Limited, St. Laurent, Quebec, Canada
No Drawing. Filed Nov. 15, 1968, Ser. No. 776,277
Int. Cl. C07d 7/00
U.S. Cl. 260—343.2                8 Claims

ABSTRACT OF THE DISCLOSURE

There are disclosed herein the compounds 10-methoxy- and 12-methoxy-3,4,5,6-tetrahydro-8H-2-benzoxecin-1,7-dione, 3,4,5,6,8,9-hexahydro-2-benzoacycloundecene-1,7-dione and its 11-hydroxy and 11-acetoxy derivatives, and 3,4,5,6,9,10 - hexahydro-12-methoxy-8H-2-benzoxacyclododecane-1,7-dione, as well as its 2-methyl derivative. The intermediates used to prepare the above compounds are also disclosed, viz., 2(4'-hydroxybutyl)-5-methoxy-and-7-methoxy - indan - 1-one, 3,4-dihydro-2(4'-hydroxybutyl)-2H-naphthalene-1-one, and its 6-hydroxy, 6-acetoxy, and -6 methoxy derivatives, 2-(4'-hydroxybutyl)-, 2-(pent-4'-enyl)-, and 2-(4'-hydroxypentyl)-7-methoxy-2,3,4,5-tetrahydro - 1H - benzocyclohepten-1-one, 8-methoxy- and 10-methoxy - 2,3,4,5 - tetrahydro-6H-indeno-[1,2-b]oxepin, 2,3,4,5,6,7-hexahydronaphth[1,2-b]oxepin and its 9-acetoxy derivative and 2,3,4,5,7,8-hexahydro-10-methoxy-6H-benzocyclohepten[1,2-b]oxepin and its 2-methyl derivative.

The compounds are useful as antibacterial agents, and methods for their preparation and use are also given.

The present invention relates to macrocyclic ketolactones of ortho-substituted benzoic acids of the Formula I:

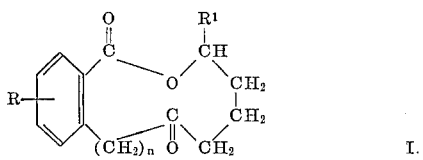

in which R represents hydrogen, hydroxyl, acetoxy, or the methoxy group, $R^1$ represents hydrogen or methyl, and n represents an integer from 1 to 3, to a process for preparing those compounds, and to intermediates used in their syntheses.

The compounds of this invention may be regarded as ketolactones of substituted benzoic acids, and the compounds in which $n=1$ have also been designated as derivatives of benzoxecin, those in which $n=2$ as derivatives of benzoxacycloundecene, and those in which $n=3$ as derivative of benzoxacyclododecane.

The compounds of this invention are useful as antibacterial agents for topical administration, being active against *Staphylococcus pyogenes* (both penicillin-resistant- and penicillin-sensitive strains), *Sarcina lutea*, *Streptococcus fecalis*, *Escherichia coli*, *Aerobacter aerogenes*, *Salmonella pullorum*, *Pseudomonas aeruginosa*, *Proteus mirabilis*, and *Proteus vulgaris*. As such, they may be formulated with suitable solvents and/or excipients in the form of solutions, creams, ointments or lotions containing from 0.1 to 1.0 percent of the active ingredient. For the preparation of solutions suitable solvents are, for example, aqueous vehicles containing propylene glycol, for the preparation of creams or ointments, oil-in-water emulsions commonly called hydrophilic ointments are preferred bases, and for the preparation of lotions we prefer to use oil-in-water emulsions stabilized with surface-active agents. Such preparations may be applied to infected areas of the skin as required.

More specifically, we prefer to prepare the compounds of this invention by reacting suitably substituted 1-indanones, 1-tetralones, or benzcycloheptan-1-ones of Formula II with diethylcarbonate in the presence of an alkali metal hydride in an inert solvent such as, for example, diethyl ether or tetrahydrofuran, preferably at the reflux temperature of the mixture, to yield the corresponding 2-carbethoxy derivatives of Formula III. The latter compounds are treated with 1-acetoxy-4-bromobutane prepared as described by Cloke et al. in J. Am. Chem. Soc. vol. 61, p. 2667 (1939), using an alkali metal alkoxide in solution in an anhydrous lower alkanol as the condensing agent, preferably at the reflux temperature of the mixture, to obtain the corresponding 2-(4'-acetoxybutyl)-2-carbethoxy derivatives of Formula IVa in which $R^2$ represents the 4'-acetoxybutyl group. The latter compounds are not isolated, but are immediately treated with an alkali metal hydroxide in solution in an aqueous lower alkanol, preferably at the reflux temperature of the mixture, to effect hydrolysis of the terminal acetoxy and the carbethoxy groups with concomitant decarboxylation, to yield the corresponding 2(-4'-hydroxybutyl) derivatives of Formula Va in which $R^2$ represents the 4'-hydroxybutyl group. Those last-named compounds are cyclized by subjecting them to dehydrating conditions, such as, for example, distillation, or preferably, refluxing with p-toluenesulfonic acid in an aromatic hydrocarbon solvent, such as, for example, benzene or toluene, with concomitant removal of water. In this manner there are obtained the corresponding cyclic enol ethers of Formula VI in which $R^1$ represents hydrogen. Treatment of those last-named compounds with m-chloroperbenzoic acid yields the desired macrocyclic ketolactones of Formula I in which R represents hydrogen or the methoxy group, and $R^1$ represents hydrogen.

When it is desired to obtain the compounds of this invention in which $R^1$ represents the methyl group, the compounds of Formula III are treated with 5-bromopent-1-ene in the same manner as dscribed above, to yield the corresponding 2-(pent-4'-enyl)-2-carbethoxy derivative of Formula IVb. The latter compounds are treated with an alkali metal hydroxide in solution in an aqueous lower alkanol as described above, to yield the corresponding 2-(pent-4'-enyl)-derivatives of Formula Vb, which are then hydrated by treatment with aqueous sulfuric acid, or by oxymercuration according to the method of Brown et al. described in J. Am. Chem. Soc., vol. 89, p. 1522 (1967), to yield the corresponding 2-(4'-hydroxypentyl) derivatives of Formula Vc. The latter compounds are then subjected to the same cyclizing and dehydrating conditions, followed by treatment with m-chloroperbenzoic acid, as described above, to yield the compounds of Formula I in which $R^1$ represents the methyl group.

The above sequences of reactions are limited to the compounds in which R represents hydrogen or the methoxy group. When it is desired to obtain compounds of Formula I in which R represents the hydroxy or the acetoxy group, the 2-(4'-hydroxybutyl) or 2-(4'-hydroxypentyl) derivatives of Formulae Va or Vc in which R represents the methoxy group are treated with potassium t-butoxide in dimethylsulfoxide in the presence of thiophenol according to the method described by Illuminati et al. in J. Am. Chem. Soc., vol. 71, p. 3349 (1949) to yield the corresponding compounds of Formulae Va or Vc in which R represents the hydroxyl group. The latter compounds are selectively acetylated in the phenolic group only, by treatment with acetic anhydride in pyridine at room temperature, to yield the corresponding phenolic acetates of Formulae Va or Vc in which R represents the acetoxy group. Cyclization of the latter compounds under dehydrating conditions followed by treatment with m-chloroperbenzoic acid, both as described above, yields the compounds of Formula I in which R represents the acetoxy group. Treatment of those last-named compounds with sodium carbonate in aqueous methanol at room temperature yields the compounds of Formula I in which R represents the hydroxyl group.

The following examples and formulae in which R, $R^1$, $R^2$ and $n$ are as defined above, will illustrate this invention.

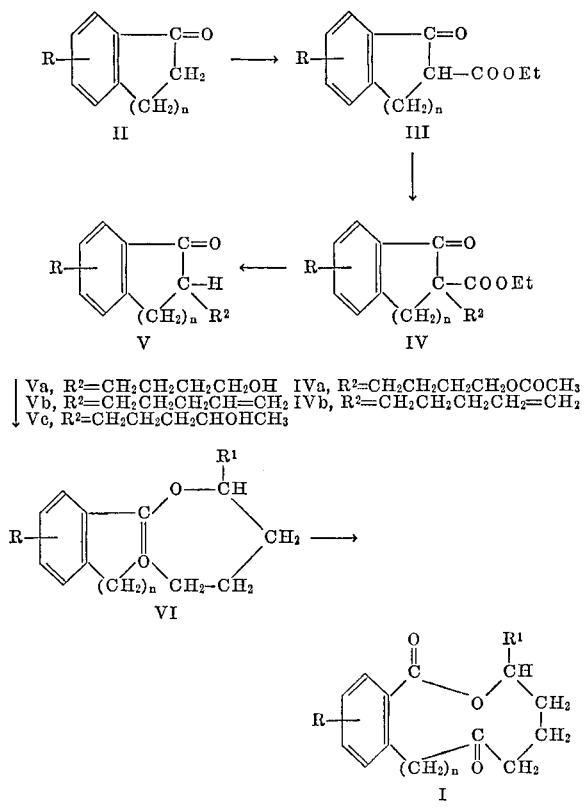

EXAMPLE 1

Commercial sodium hydride suspension containing 55% sodium hydride (6.9 g.) is washed with hexane, then with dry tetrahydrofuran and suspended in 80 ml. of dry tetrahydrofuran. Diethyl carbonate (18.6 g.) is added, and the mixture is stirred and heated to reflux under an atmosphere of dry nitrogen. 5-methoxyindan-1-one (13.8 g.), prepared as described by W. S. Johnson et al. in J. Am. Chem. Soc. vol. 66, p. 218 (1944) dissolved in 155 ml. of dry tetrahydrofuran is added, and refluxing is continued for two days. To the cooled reaction mixture 9 ml. of glacial acetic acid are slowly added, the reaction mixture is taken up in ether and washed several times with saturated sodium chloride solution. The crude product obtained after drying and evaporation of the ether is distilled and 2-carbethoxy-5-methoxyindan-1-one is obtained with B.P. 153–156° C./0.5 mm. Hg.

In the same manner as described above, but using 1.7 g. sodium hydride suspension, 3.65 g. diethyl carbonate, and 2.72 g. 7-methoxyindan-1-one, prepared as described above there is obtained 2-carbethoxy-7-methoxyindan-1-one with B.P. 156–158° C./0.5 mm. Hg and M.P. 54–57° C.

In the same manner as described above, but using 4.5 g. sodium hydride suspension, 12.0 g. diethylcarbonate, and 9.0 g. tetralone, there is obtained 2-carbethoxy-3,4-dihydro-2H-naphthalen-1-one, B.P. 109° C./0.2 mm. Hg.

In the same manner as described above but using 10.0 g. of sodium hydride, 26.8 g. of diethylcarbonate, and 20.0 g. of 3,4-dihydro-6-methoxy-2H-naphthalen-1-one there is obtained 2-carbethoxy-3,4-dihydro-6-methoxy-2H-naphthalen-1-one, B.P. 150–154° C./0.3 mm. Hg.

In the same manner, but using 5.0 g. of sodium hydride suspension, 13.4 g. of diethylcarbonate, and 10.6 g. of 7 - methoxy - 2,3,4,5 - tetrahydro - 1H - benzocyclohepten-1-one prepared as described by Horton et al. in J. Org. Chem., vol. 25, p. 131 (1960), there is obtained 2-carbethoxy - 7 - methoxy - 2,3,4,5 - tetrahydro - 1H - benzocyclohepten-1-one, B.P. 154° C./0.5 mm. Hg.

EXAMPLE 2

Potassium (3.4 g.) is dissolved in 150 ml. tertiary butanol, 2 - carbethoxy - 5 - methoxyindan - 1 - one (10.0 g.) dissolved in 150 ml. tertiary butanol is added and the mixture is refluxed for 30 minutes under nitrogen. 1-bromo-4-acetoxybutane (40 ml.) is added, and after refluxing overnight the reaction mixture is cooled and 10 ml. glacial acetic acid are slowly added. Most of the t-butanol is removed in vacuo. The residue is taken up in chloroform, washed several times with saturated sodium chloride solution, dried and evaporated under reduced pressure.

The excess of alkyl halide is removed by evaporation at 0.3 mm. Hg. The residue is 2-(4'-acetoxybutyl)-2-carbethoxy-5-methoxyindan-1-one and is used without further purification for the next step.

The crude product obtained (15.0 g.) is dissolved in ethanol, a solution of 4.8 g. potassium hydroxide in 8 ml., water is added and the mixture is refluxed under nitrogen overnight. Solid potassium hydroxide (1.0 g.) is then added and refluxing is continued for two hours. The reaction mixture is taken up in ether, washed with water, dried and evaporated, and the residue is chromatographed over a 30-fold amount of neutral alumina (Woelm, activity 2). Elution with benzene or benzene-diethyl ether 5:1 yields 2-(4'-hydroxybutyl) - 5 - methoxyidan - 1 - one, the desired product 2-(4'-hydroxybutyl)-7-methoxyindan-crystallized from ether-petroleum ether with M.P. 51–52° C.

In the same manner but starting with 2 g. of 2-carbethoxy-7-methoxyidan-1-one and using 0.69 g. of potassium and 8.0 ml. of 1-acetoxy-4-bromobutane there is obtained after hydrolysis of the crude intermediate 2-carbethoxy-2-(4'-acetoxybutyl)-7-methoxyindan-1 - one, the desired product 2-4'-hydroxybutyl)-7-methoxyindan-1-one, M.P. 71–72° C. after crystallization from ether-petroleum ether.

In the same manner as described above, but using 8.16 g. of 2-carbethoxy-3,4-dihydro-2H-naphthalen-1-one, 3.2 g. of potassium and 35.0 ml. of 1-acetoxy-4-bromobutane there is obtained 3,4-dihydro - 2 - (4' - hydroxybutyl)-2H-naphthalen-1-one, an oil characterized by $$\nu^{film}_{max.}\ 3410,\ 1600\ cm.^{-1}$$

In the same manner as described above, but using 5.0 g. of 2-carbethoxy-3,4-dihydro-6-methoxy-2H-naphthalen-1-one, 1.62 g. of potassium, and 20 ml. of 1-acetoxy-4-bromobutane, there is obtained 3,4-dihydro - 2 - (4'-hydroxybutyl)-6-methoxy-2H-naphthalene-1-one, M.P. 57–59° C. after crystallization from ether-petroleum ether.

In the same manner as described above, but using 8.12 g. of 2-carbethoxy-7-methoxy - 2,3,4,5 - tetrahydro - 1H-benzocyclohepten-1-one, 2.48 g. of potassium and 30.0 ml. of 1-acetoxy-4-bromobutane, there is obtained 2-(4'-hydroxybutyl)-7-methoxy-2,3,4,5-tetrahydro - 1H - benzocyclohepten-1-one, an oil characterized by $$\nu^{film}_{max.}\ 3430,\ 1670\ cm.^{-1}$$

EXAMPLE 3

2-(4'-hydroxybutyl)-5-methoxyidan-1-one (5.68 g.) is dissolved in 100 ml. of benzene, 400 mg. para-toluenesulfonic acid is added and the reaction mixture is refluxed with a water separator for 20 hours. The benzene is then removed under reduced pressure, the reaction mixture is taken up in a mixture of benzene petroleum ether 1:1 and filtered through a 20-fold amount of neutral alumina (Woelm, activity 2). 8-methoxy-2,3,4,5 - tetrahydro - 6H-indeno[1,2-b]oxepin is eluted and obtained with B.P. 186–189° C./8 mm. Hg, M.P. 52° C.

In the same manner, but using 0.345 g. of 2-(4'-hydroxybutyl)-7-methoxyidan-1-one, 50 mg. of p-toluenesulfonic acid, and 20 ml. of benzene there is obtained 10-methoxy-2,3,4,5-tetrahydro-6H-indeno[1,2 - b]oxepin, an oil characterized by $$\nu_{max}^{film}\ 1625,\ 1600\ cm.^{-1}$$

Also in the same manner, but using 5.8 g. of 3,4-dihydro-2-(4'-hydroxybutyl)-2H-naphthalen-1-one, 200 mg. of p-toluene-sulfonic acid, and 100 ml. of benzene there is obtained 2,3,4,5,6,7-hexahydronaphth[1,2 - b]oxepin, B.P. 98° C./0.2 mm. Hg.

Again in the same manner, but using 4.3 g. of 2-(4'-hydroxybutyl)-7-methoxy-2,3,4,5-tetrahydro - 1H - benzocyclohepten-1-one, 300 mg. of p-toluenesulfonic acid, and 50 ml. of benzene there is obtained 2,3,4,5,7,8-hexahydro-10-methoxy-6H-benzocyclohepten[1,2 - b]oxepin with B.P. 141–143° C./0.3 mm. Hg.

EXAMPLE 4

Meta-chloroperbenzoic acid (3.7 g.) is suspended in 8 ml. of methylene chloride. 8-methoxy-2,3,4,5-tetrahydro-6H-indeno[1,2-b]oxepin (1.29 g.), dissolved in 5 ml. methylene chloride, is added dropwise at such a rate as to maintain boiling. The reaction mixture is allowed to stand at room temperature over night, filtered, diluted with methylene chloride, washed with 7% aqueous potassium carbonate and then with saturated sodium chloride solution, and dried. The residue obtained upon evaporation of the methylene chloride is chromatographed over 30 parts neutral alumina (Woelm, activity 2). Elution with petroleum ether-benzene mixtures and benzene yields 10-methoxy-3,4,5,6-tetrahydro - 8H - 2 - benzoxecin-1,7-dione, M.P. 97–98° C. after crystallization from acetone-hexane.

In the same manner, but using 130 mg. 10-methoxy-2,3,4,5-tetrahydro-6H-indeno[1,2 - b]oxepin, 370 mg. of m-chloroperbenzoic acid, and 2.5 ml. of methylene chloride there is obtained 12-methoxy-3,4,5,6-tetrahydro-8H-2-benzoxecin-1,7-dione, M.P. 123–124° C. after recrystallization from acetone-hexane.

Also in the same manner, but using 2.69 g. of 2,3,4,5,6,7-hexahydronaphth[1,2-b]oxepin, 8.1 g. m-chloroperbenzoic acid, and 37 ml. methylene chloride there is obtained 3,4,5,6,8,9-hexahydro-2 - benzoxacycloundecene-1,7-dione, B.P. 138–144° C./0.2 mm. Hg.

Again in the same manner, but using 1.03 g. of 2,3,4,5,7,8-hexahydro - 10 - methoxy - 6H - benzocyclohepten[1,2-b]oxepin, 2.9 g. of m-chloroperbenzoic acid, and 16 ml. of methylene chloride there is obtained 3,4,5,6,9,10-hexahydro-12-methoxy-8H-2-benzoxacyclododecene - 1,7-dione, M.P. 92–93° C. after crystallization from acetone-hexane.

EXAMPLE 5

To a solution of thiophenol (21.15 g.) in dry dimethylsulfoxide (120 ml.) under nitrogen potassium-t-butoxide (24.6 g.) is added. The mixture is stirred until solution is complete. A solution of 3,4-dihydro-2-(4'-hydroxybutyl)-6-methoxy 2H-naphthalen-1-one (7.2 g.) in dimethylsulfoxide (35 ml.) is added to the above solution, and the reaction mixture is heated to 120° and kept at that temperature for seven and a half hours. The reaction mixture is poured into water (400 ml.) containing 4.4 ml. acetic acid. The precipitate is extracted with ethyl acetate, washed with water, the organic layer dried and the solvent evaporated. The residue is suspended in ice cold ether and filtered to yield 3,4-dihydro-6-hydroxy - 2 - (4' - hydroxybutyl)-2H-naphthalen-1-one, M.P. 171–174° C.

EXAMPLE 6

To a solution of 3,4 - dihydro-6-hydroxy-2-(4'-hydroxybutyl)-2H-naphthalen-1-one (4.5 g.) in dry pyridine (73.5 ml.) a mixture of pyridine and acetic anhydride (25:1, 73.5 ml.) is added and the mixture is stirred for 40 minutes. The reaction is quenched by adding water (20 ml.) and most of the solvent is removed under reduced pressure. The residue is stirred with 10 ml. of 3% hydrochloric acid for five minutes. The organic material is extracted with ether, washed with water, dried, and the solvent evaporated. The residue is chromatographed on silica gel (125 g.) in benzene. Elution with 10–20% ether/benzene yields 6-acetoxy-3,4 - dihydro - 2 -(4' - hydroxybutyl) -2H - naphthalen-1-one, M.P. 56–58° C., after crystallization from ether-hexane.

EXAMPLE 7

A solution of 6 - acetoxy-3,4-dihydro-2-(4'-hydroxybutyl)-2H-naphthalen-1-one (3 g.) in dry benzene (300 ml.) is heated to distill off some benzene (30 ml.). p-Toluenesulfonic acid (0.15 g.) is added to the above solution and the mixture is refluxed for two hours, using a Dean-Stark water separator. The mixture is cooled, diluted with petroleum ether (B.P. 30–60°) and filtered through a column of 50 g. neutral alumina (Woelm, activity 2) in benzene-petroleum ether (1:1). Elution with the same solvent yields 9-acetoxy-2,3,4,5,6,7-hexahydronaphth[1,2-b]-oxepin, a solid characterized by $$\nu_{max}^{CHCl_3}\ 1760,\ 1655\ cm.^{-1}$$

EXAMPLE 8

To a suspension of m-chloroperbenzoic acid (2.7 g.) in methylene chloride (distilled over potassium carbonate, 4 ml.) a solution of 9-acetoxy-2,3,4,5,6,7-hexahydronaphth[1,2-b]oxepin (1.1 g.) in methylene chloride (3.5 ml.) is added dropwise. An exothermic reaction takes place during the addition and the mixture reaches its boiling point. The mixture is stirred for 2 hours, the methylene chloride is removed carefully, the residue is suspended in dry benzene, and filtered. The precipitate is washed with benzene and the benzene extracts are filtered through a column of 40 g. neutral alumina (Woelm, activity 2). Elution with benzene yields 11-acetoxy-3,4,5,6,8,9-hexahydro-2-benzoxacycloundecene-1,7-dione, M.P. 109–111° C. after crystallization from choroform-hexane.

EXAMPLE 9

To a solution of 11 - acetoxy-3,4,5,6,8,9-hexahydro-2-benzocycloundecene-1,7-dione (0.87 g.) in methanol (6 ml.) a solution of sodium carbonate (0.318 g.) in water (3 ml.) is added and the mixture is stirred at room temperature for ten minutes. The mixture is diluted with ether and washed with water. The aqueous layer is acidified with 3% hydrochloric acid (ca. 5 ml.), re-extracted with ether, washed, dried, and the solvent is removed under reduced pressure to yields 3,4,5,6,8,9-hexahydro-11-hydroxy - 2-benzoxacycloundecene-1,7-dione, M.P. 154–155° C. after recrystallization from chloroform-hexane.

EXAMPLE 10

Potassium metal (1.155 g.) is dissolved in 70 ml. tert.-butanol, 2 - carbethoxy-7-methoxy-2,3,4,5-tetrahydro-1H-benzocyclohepten-1-one (3.5 g.) is added and the mixture is refluxed for 30 minutes under nitrogen. 5-bromopent-1-ene (14 ml.) is slowly added and refluxing is continued for 15 hours. After cooling, 6 ml. of acetic acid are added, the reaction mixture is taken up in ether and washed with saturated sodium chloride solution. After drying and evaporation of the ether and of the excess 5-bromopent-1-ene there is obtained 2-carbethoxy-7-methoxy-2-(pent-4-enyl)-2,3,4,5-tetrahydro-1H-benzocyclohepten-1-one.

The latter compound, without purification, is dissolved in 40 ml. ethanol and is refluxed under nitrogen overnight together with 2.72 g. potassium hydroxide in 14 ml. water. The mixture is cooled, taken up in ether and washed with 2 N potassium hydroxide solution, then with saturated sodium chloride solution. Drying of the ether and evaporation yields 7-methoxy-2-(pent-4'-enyl)-2,3,4,5 - tetrahydro-1H-benzocyclohepten-1-one, B.P. 143–150° C./0.3 mm. Hg.

EXAMPLE 11

7 - methoxy - 2 - (pent-4'-enyl)-2,3,4,5-tetrahydro-1H-benzocyclohepten - 1-one (1.920 g.) and 40 ml. aqueous sulfuric acid (60%) are stirred under nitrogen overnight. Ice is added, the reaction mixture is taken up in ether and washed neutral with saturated sodium chloride solution. After drying and evaporation of the ether the residue is chromatographed over a 30-fold amount of neutral alumina (Woelm, activity 2). Benzene-ether 5:1 elutes 7-methoxy - 2 (4' - hydroxypentyl) - 2,3,4,5-tetrahydro-1H-benzocyclohepten-1-one, an oil characterized by $\nu_{max.}^{film}$ 3400, 1670, 1600 cm.$^{-1}$ Alternatively, 8.6 g. mercuric acetate are dissolved in 40 ml. water and 20 ml. of tetrahydrofuran are added, to obtain a yellow complex 7-methoxy-2-(pent-4'-enyl)-2,3,4,5 - tetrahydro-1H-benzocyclohepten-1-one (7.12 g.), dissolved in 20 ml. tetrahydrofuran, are added with stirring. After disappearance of the yellow color, stirring is continued for 10 minutes, 3 N sodium hydroxide (38 ml.) and 38 ml. of 0.5 molar sodium borohydride in 3 N sodium hydroxide are added, and stirring is continued for another 30 minutes. About 30 g. sodium chloride is added, the mixture is taken up in ether and the ether layer is washed with saturated aqueous sodium chloride solution. Drying and evaporating the ether, taking up the residue in benzene, and filtering the benzene solution through a twenty-fold amount of neutral alumina (Woelm, activity 2) yields 7-methoxy-2-(4'-hydroxypentyl)-2,3,4, 5 - tetrahydro-1H-benzocyclohepten-1-one, identical with the compound obtained as described above.

EXAMPLE 12

7-methoxy-2-(4'-hydroxypentyl)-2,3,4,5-tetrahydro-1H-benzocyclohepten-1-one (930 mg.), 50 mg. p-toluene-sulfonic acid and 50 ml. benzene are refluxed with a water separator for 60 hours. The benzene is removed under reduced pressure, the mixture is taken up in petroleum ether-benzene (1:1) and filtered through 20 g. of neutral alumina (Woelm, activity 2) to obtain 2,3,4,5,7,8-hexahydro-10-methoxy-2-methyl-6H-benzocyclohepten[1,2-b]oxepin, an oil characterized by $\nu_{max.}^{film}$ 1640, 1600 cm.$^{-1}$

EXAMPLE 13 m-Chloroperbenzoic acid (1.73 g.) is suspended in 5 ml. methylene chloride and 2,3,4,5,7,8-hexahydro-10-methoxy-2-methyl-6H-benzocyclohepten[1,2-b]oxepin (620 mg.) dissolved in 3 ml. methylene chloride are added slowly. An exothermic reaction takes place. The mixture is left overnight, then filtered and the solid is washed with methylene chloride. The filtrates are washed with 5% potassium carbonate solution, then with saturated sodium chloride solution, dried, and the solvent evaporated. The residue is chromatographed over a 30 fold amount of neutral alumina (Woelm, activity 2). Elution with petroleum ether-benzene and benzene yields 3,4,5,6,9,10-hexahydro-2-methyl - 12 - methoxy-8H-2-benzoxacyclododecene-1,7-dione, M.P. 60–61° C., after crystallization from ether-petroleum ether.

We claim:
1. A compound selected from those of the formula

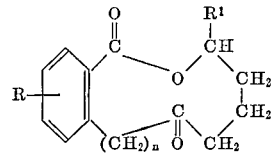

wherein R represents hydrogen, hydroxyl, acetoxy or the methoxy group; R$^1$ represents hydrogen or methyl; and $n$ represents an integer ranging from 1 to 3.

2. 10-methoxy-3,4,5,6-tetrahydro-8H-2-benzoxecin-1,7-dione.

3. 12-methoxy-3,4,5,6-tetrahydro-8H-2-benzoxecin-1,7-dione.

4. 3,4,5,6,8,9-hexahydro-2-benzoxacycloundecene - 1,7-dione.

5. 3,4,5,6,8,9-hexahydro-11-hydroxy-2-benzoxacycloundecene-1,7-dione.

6. 11-acetoxy-3,4,5,6,8,9-hexahydro-2-benzoxacycloundecene-1,7-dione.

7. 3,4,5,6,9,10-hexahydro-12-methoxy-8H-2-benzoxacyclododecene-1,7-dione.

8. 3,4,5,6,9,10 - hexahydro-2-methyl-12-methoxy-8H-2-benzoxacyclododecene-1,7-dione.

References Cited
UNITED STATES PATENTS
3,239,354   3/1966   Hodge et al. _____ 260—343.2

OTHER REFERENCES
Birch et al.: Chemical Abstracts, vol. 56, cols. 15418-9 (1962).

JOHN M. FORD, Primary Examiner

U.S. Cl. X.R.

424—279; 260—488, 590, 333, 473